(12) United States Patent
Byron

(10) Patent No.: US 7,063,275 B2
(45) Date of Patent: Jun. 20, 2006

(54) SPRAYER HAVING A SPRAY SHIELD AND A SPRAY SHIELD RETAINER

(75) Inventor: David Byron, Honeoye Falls, NY (US)

(73) Assignee: Chapin Manufacturing, Inc., Batavia, NY (US)

(*) Notice: Subject to any disclaimer, the term of this patent is extended or adjusted under 35 U.S.C. 154(b) by 173 days.

(21) Appl. No.: 10/858,009

(22) Filed: Jun. 1, 2004

(65) Prior Publication Data

US 2004/0262427 A1  Dec. 30, 2004

Related U.S. Application Data

(60) Provisional application No. 60/474,069, filed on May 29, 2003.

(51) Int. Cl.
*B05B 1/28* (2006.01)

(52) U.S. Cl. ............... 239/288; 239/288.3; 239/288.5; 239/373; 239/333; 239/152; 239/530; 239/518; 239/523; 239/524; 239/521; 239/24; 239/79; 239/104; 239/150; 222/323; 222/328; 222/402.12; 222/401; 222/400.8; 222/143; 222/144

(58) Field of Classification Search ............ 239/288.5, 239/373, 333, 152, 530, 518, 523, 524, 521, 239/288, 288.3; 222/323, 328, 402.12, 401, 222/400.8, 143, 144
See application file for complete search history.

(56) References Cited

U.S. PATENT DOCUMENTS

| | | | |
|---|---|---|---|
| 1,875,992 A * | 9/1932 | Clifford | 222/321.1 |
| 3,993,245 A * | 11/1976 | Smith | 239/8 |
| 4,135,669 A * | 1/1979 | Bridges et al. | 239/373 |
| 4,192,464 A * | 3/1980 | Chow | 239/373 |
| 4,761,850 A | 8/1988 | Romeo et al. | |
| 4,787,560 A * | 11/1988 | DeYoreo | 239/373 |
| 4,930,664 A * | 6/1990 | Ellison | 222/1 |
| 5,186,391 A * | 2/1993 | Roueche et al. | 239/373 |
| 5,307,995 A * | 5/1994 | Jackson et al. | 239/373 |
| 5,414,353 A * | 5/1995 | Weischedel | 324/232 |
| 5,544,443 A * | 8/1996 | Steglich | 47/1.5 |
| 5,911,520 A * | 6/1999 | Kenney | 4/615 |
| 5,984,199 A * | 11/1999 | Restive | 239/1 |
| 6,135,361 A * | 10/2000 | Grassi | 239/172 |
| 6,155,497 A * | 12/2000 | Hudson et al. | 239/373 |
| 6,179,224 B1 | 1/2001 | Huesken | |
| 6,679,438 B1 | 1/2004 | Didlo | |
| 6,695,228 B1 * | 2/2004 | Odessa | 239/337 |
| D490,140 S * | 5/2004 | Byron | D23/225 |
| D490,877 S * | 6/2004 | Byron | D23/225 |

FOREIGN PATENT DOCUMENTS

| | | |
|---|---|---|
| AU | 463740 | 8/1975 |
| GB | 225060 | 11/1924 |
| GB | 1 513 711 | 6/1978 |

* cited by examiner

*Primary Examiner*—David A. Scherbel
*Assistant Examiner*—Trevor McGraw
(74) *Attorney, Agent, or Firm*—Kenneth J. Lukacher

(57) ABSTRACT

A sprayer has a spray shield and a spray shield retainer. The spray shield is removably attached to the spray shield retainer for efficient storage when not in use. The spray shield can be contoured to the body of the sprayer. The spray shield is configured for attachment to a spray wand proximate to a nozzle.

5 Claims, 9 Drawing Sheets

SPRAYER HAVING A SPRAY SHIELD AND A SPRAY SHIELD RETAINER

CROSS-REFERENCE TO RELATED APPLICATIONS

This application claims the benefit of U.S. Provisional application 60/474,069 filed on May 29, 2003, the entire disclosure of which is incorporated by reference in it entirety for any and all purposes.

BACKGROUND

It is customary for gardeners, both professional and amateur, to apply various types of fertilizers, insecticides, pesticides and herbicides by spray applicators. Typically these spray applicators include a tank which contains the liquid to be sprayed. Often liquid is provided in concentrated form and is mixed with water and then poured into the tank. The tank may be of varying capacity from a gallon or two to one having a much larger volume. The contents of the tank may be pressurized either by a hand pump and in some cases may be pressurized using an air source such as an air compressor. A flexible hose is attached to the tank and is then connected to a feed tube which depends within the tank. A tubular wand at the end of the flexible hose is attached to a spray nozzle which is often adjustable to regulate the spray from a fan-shaped spray to a more concentrated stream. A valve having a lever is manually operably to control the flow from the nozzle.

Because of wind conditions, or improper use of the spray device due to inattentiveness or carelessness, the spray may drift onto the user. This may be a particularly serious problem, especially when chemicals such as herbicides or other chemicals potentially harmful to humans are being applied. Therefore, even if the users of such equipment are extremely careful, unintended harm can result when spraying, particularly when using lawn, garden and agricultural chemicals.

U.S. Pat. No. 6,679,438 discloses a spray shield that attaches to a sprayer wand and directs spray from a sprayer away from the operator. Since the spray shield projects from the slender wand, it may be awkward to store the sprayer and wand when not in use. Further, there may be occasions when the operator does not desire to use the shield when operating the sprayer. However, the prior art does not disclose a way to conveniently and efficiently store the spray shield when it is not being used.

Accordingly, there is a need in the art for a sprayer having a spray shield that can be efficiently and conveniently stored when not in use.

SUMMARY

A sprayer embodying the present invention can comprise a body; a hose operably attached to the body, the hose having a spray end; a nozzle operably attached to the hose; and a spray shield; the spray shield, the hose and the body being configured so that the spray shield is removably attached to the body and configured for attachment to the hose proximate to the nozzle.

The body can have a shield retainer to which the spray shield is removably attached. The spray shield preferably is contoured to the body.

The sprayer can further comprise a wand and the spray shield can be configured for attachment to the wand proximate to the nozzle.

BRIEF DESCRIPTION OF THE DRAWINGS

These and other features, aspects and advantages of the present invention will become better understood with regard to the following descriptions, appended claims, and accompanying drawings where:

DESCRIPTION

Figure 1:
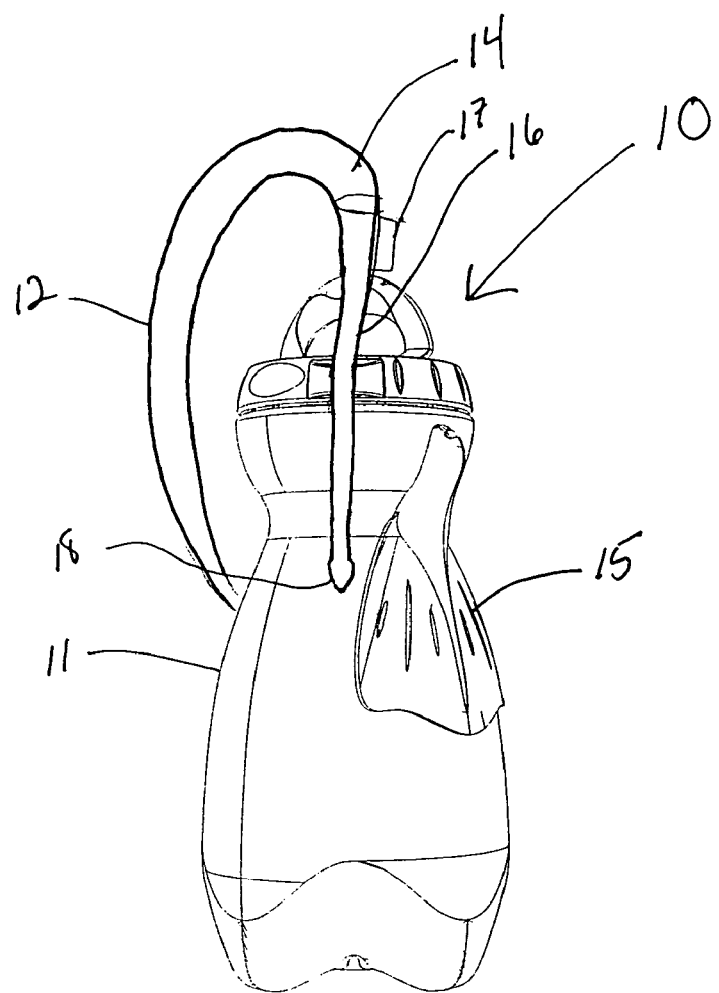
FIG. 1 is a perspective view of a sprayer embodying the invention.

Referring now to FIG. 1 sprayer 10 embodying the present invention may be of the type containing liquid to be applied under pressure through a flexible hose 12 having a spray end 14, which terminates at a wand 16. The distal end of the wand can carry a nozzle 18, which may be adjustable from a fan spray to a more concentrated spray. Generally, a hand-operated valve having a lever 17 is positioned adjacent to the distal end of the wand 16 to allow an operator to manually control the spray. This type of sprayer is well-known to those of ordinary skill in the art. A spray shield 15 can be removably attached to the sprayer 10 when the spray shield is not being use. The shield 15 preferably is configured so that when it is attached to the sprayer 10, it is substantially contoured to the sprayer.

Figure 2:
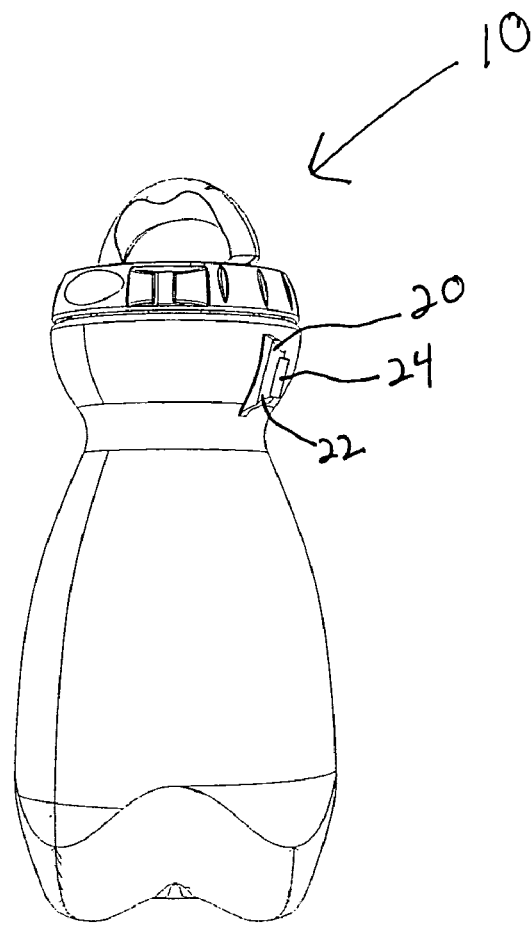
FIG. 2 is a perspective view of the sprayer of FIG. 1 without the spray shield attached.

The shield 15 preferably is attached to the sprayer 10 via a shield retainer 20. As seen best in FIG. 2, the shield retainer 20 can be molded as an integral portion of the sprayer 10 or can be attached as a separate component. In the illustrated embodiment, the shield retainer 20 is located on the sprayer body 11 and comprises an elongated protusion 22 having an elonged flange 24. The flange 24 has semi-circular horizontal cross-section.

Figure 3:
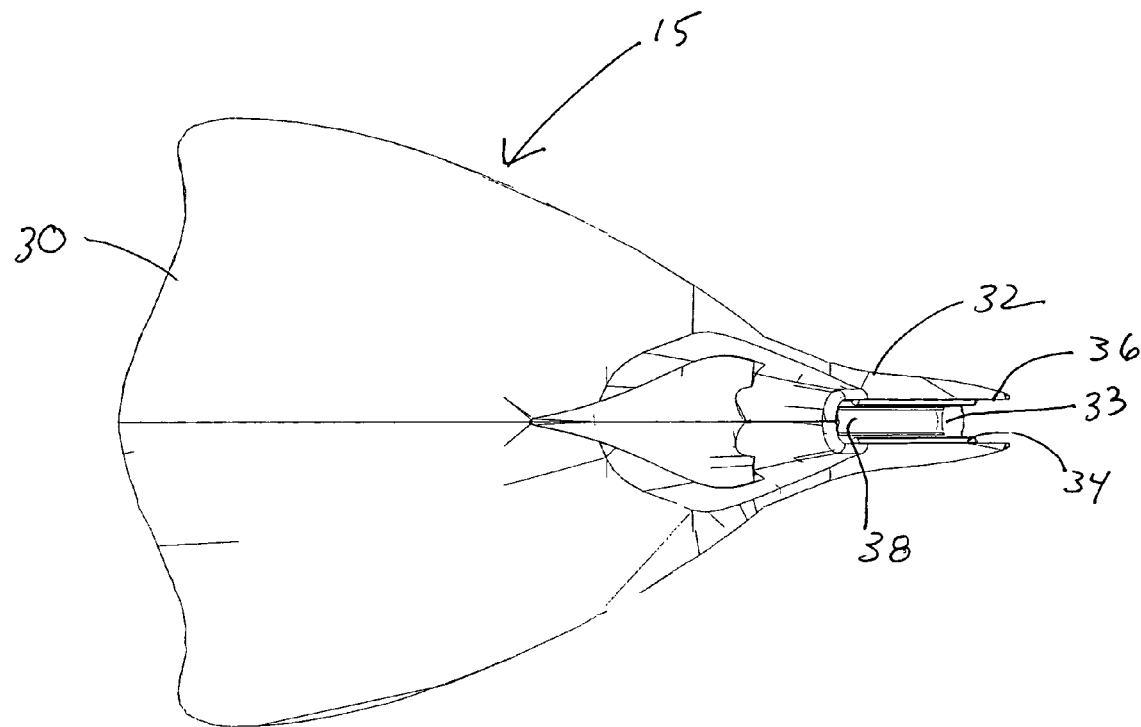
FIG. 3 is a bottom view of the spray shield of FIG. 1.

The spray shield 15 in FIG. 3 is comprised of a rigid plastic material formed by injection molding and has a flared portion 30 and a retaining portion 32. The retaining portion 32 has a groove 33 and the groove has two ridges 34 one on each side 36 of the groove, about midway between the top and the bottom of the groove. Optionally, the shield 15 can have a rubber brake 38 between the two ridges 34 in order to more securely attach the shield to the sprayer 10 and to the wand 16.

The retaining portion 34 and shield retainer 20 are configured so that the retaining portion can be releasably attached to the shield retainer via friction. The operator can easily push the retaining portion 34 on the shield retainer 20 until the retaining portion "snaps" into place. The retaining portion 34 will remain attached to the sprayer 10, as depicted in FIG. 1, until the operator pulls the spray shield 15 away from the sprayer.

Figure 4:
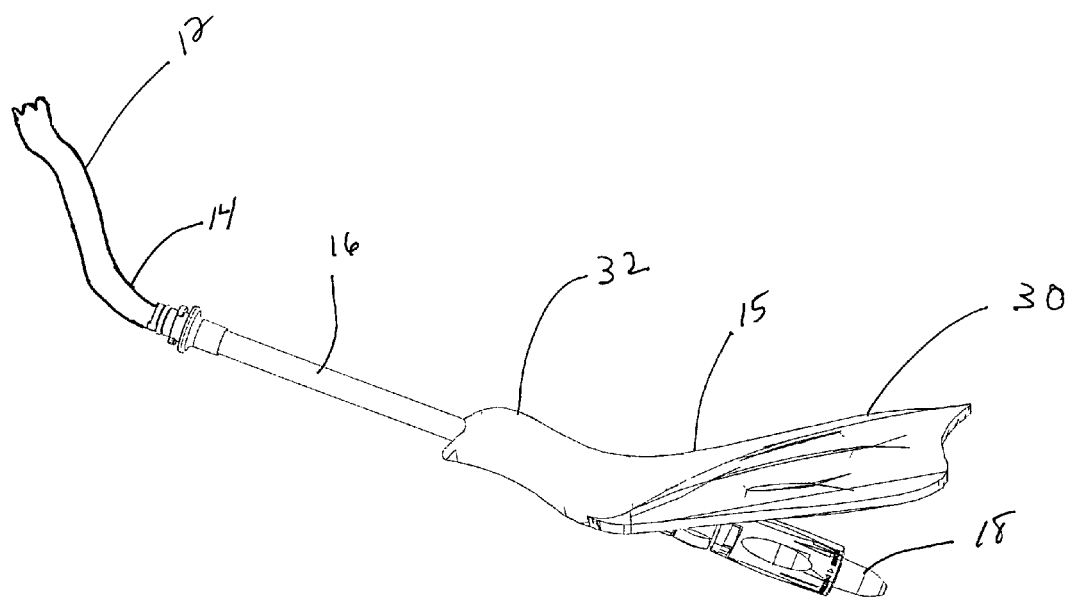
FIG. 4 is a perspective view of the spray shield of FIG. 1 attached to a wand.

When the operator wishes to utilize the spray shield, the operator can attach the spray shield to the wand in a similar manner. The operator can push the retaining portion onto the wand proximate to the nozzle until the retaining portion "snaps" into place, as shown in FIG. 4.

Figure 5:
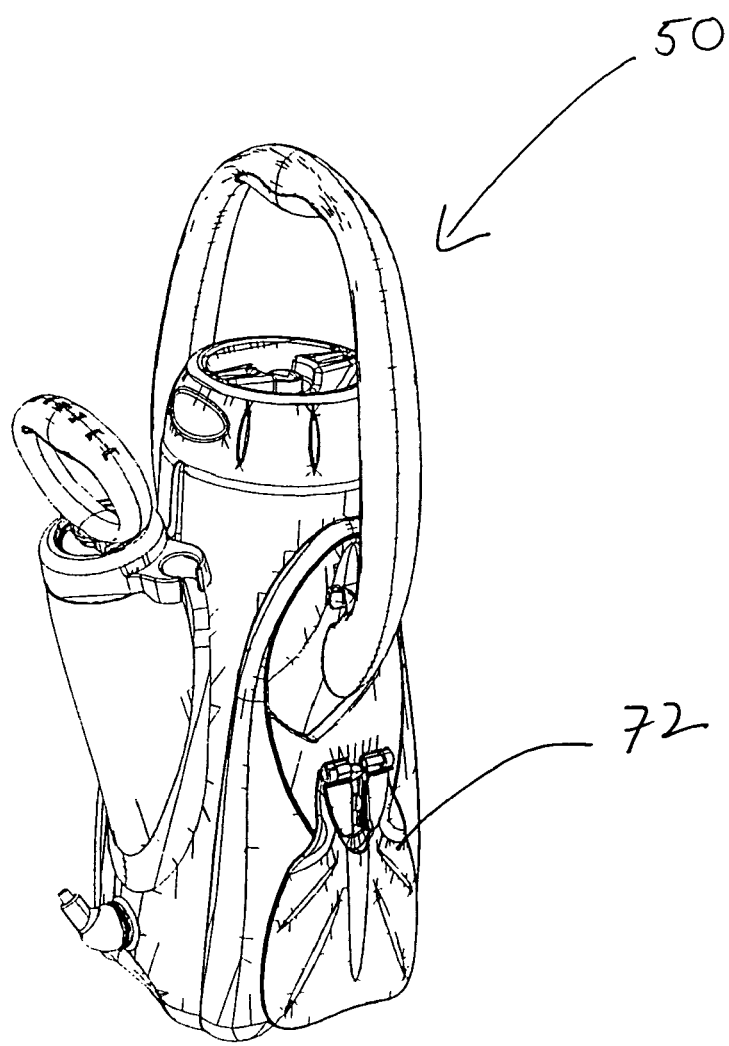
FIG. 5 is a perspective view of a second embodiment of the invention.
Figure 6:
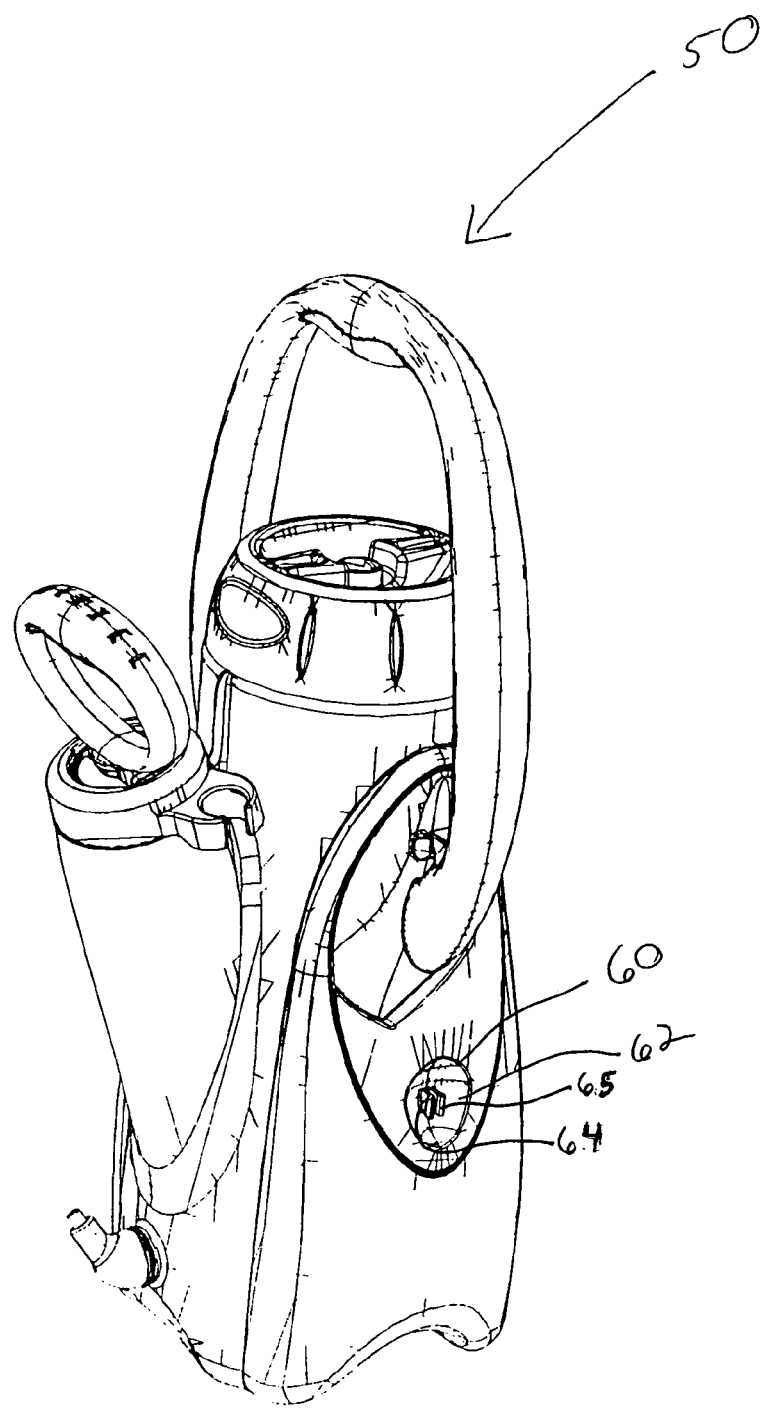
FIG. 6 is a perspective view of the sprayer of FIG. 5 without the spray shield attached.
Figure 7:
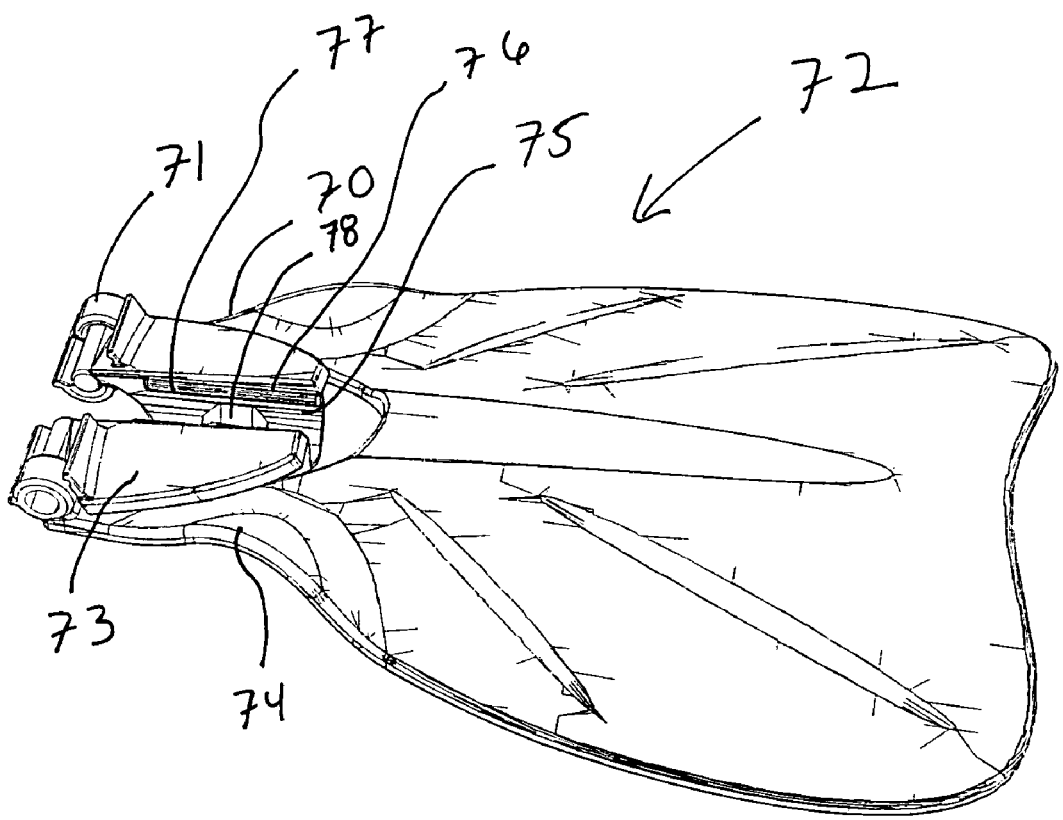
FIG. 7 is a bottom perspective view of the spray shield of FIG. 5 with the hinged portion folded.
Figure 8:
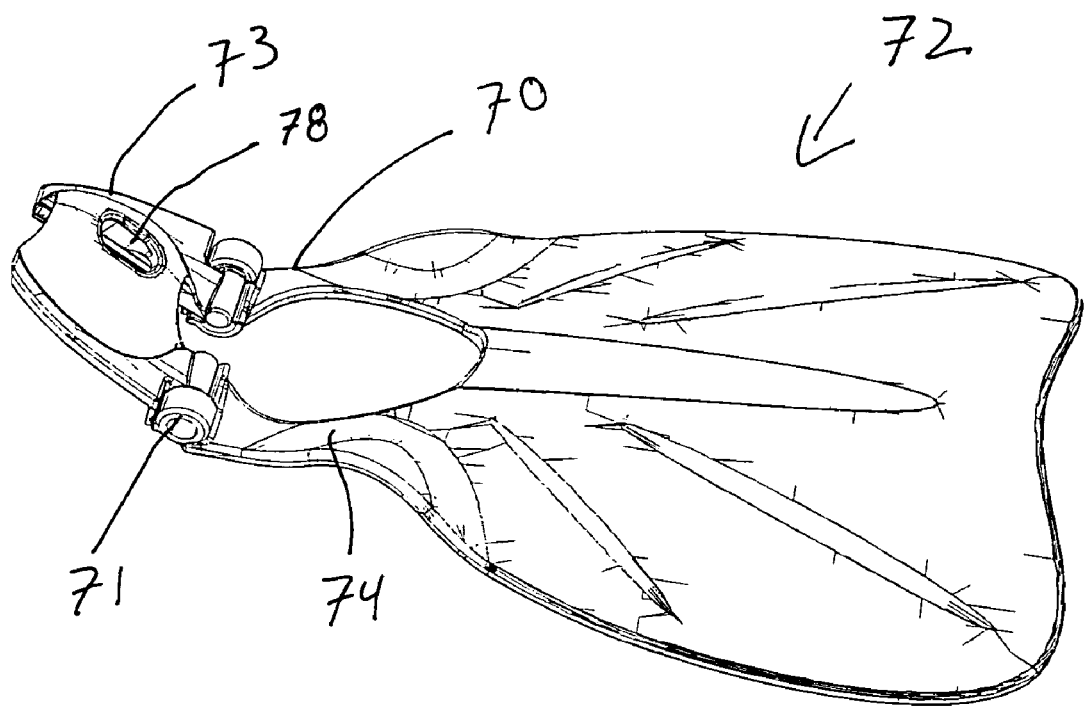
FIG. 8 is a bottom perspective view of the spray shield of FIG. 5 with the hinged portion unfolded.

FIG. 5 illustrates a second embodiment of the invention. In this embodiment, the shield retainer 60 is comprised of a cavity 62, best seen in FIG. 6, molded into the sprayer 50. The cavity 62 has two snap fingers 64. Each snap finger has a tapered retaining lip 65. Referring now to FIGS. 7 & 8, the retaining portion 70 of the shield 72 has hinge 71, a hinged portion 73 and a cut-out portion 74. The hinged portion has a groove 75. Each edge 76 of the groove 75 has a ridge 77, which helps to retain the shield 72 on the wand 16 when the shield is being utilized. The groove 75 has an aperture 78.

When the operator wishes to store the shield 72, the operator can fold the hinged portion 73 via the hinge 71 over the cut-out portion 74, as shown in FIG. 7 and push the groove 75 into the cavity 62 and the snap fingers 64 through the aperture 78. until the shield "snaps" into place as shown in FIG. 5. The tapered retaining lips 65 are spaced slightly wider than the aperture 78 so that when the groove 75 is pushed into the cavity 62 the snap fingers 64 are forced together allowing them to pass through the aperture 78. Once the tapered retaining lips 65 have passed through the aperture 78 they snap back to their original position and thereby retain the shield 72 to the sprayer 50 The shield 72 will remain attached to the sprayer 50 until the operator squeezes the retaining lips 65 apart and pulls the spray shield away from the sprayer.

Figure 9:
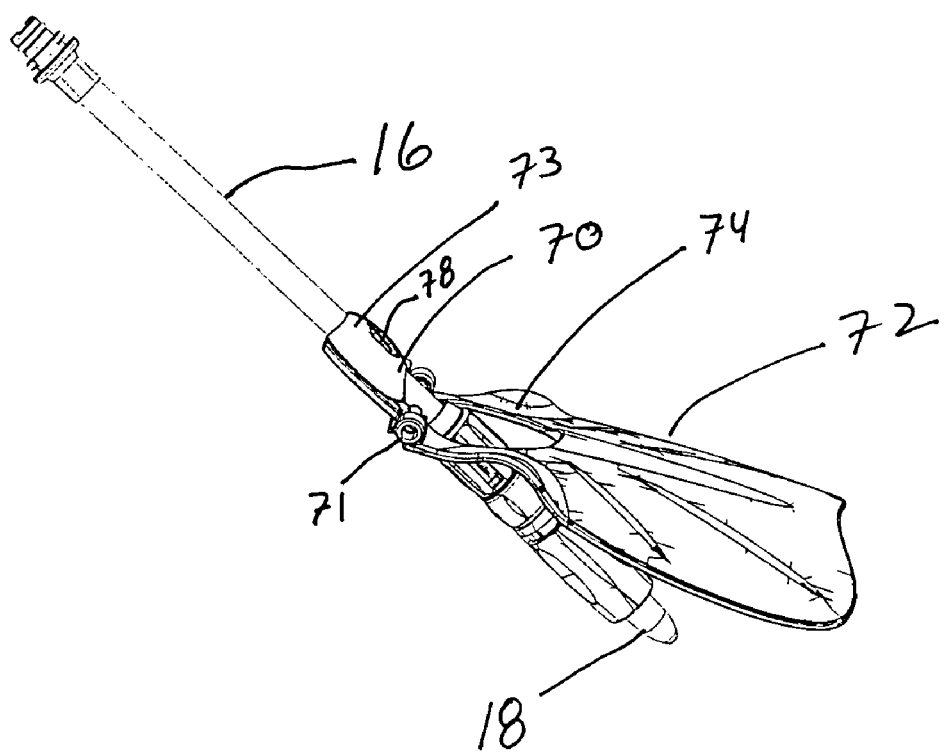
FIG. 9 is a perspective view of the spray shield of FIG. 5 attached to a wand.

When the operator wishes to utilize the spray shield 72, the operator can unfold the retaining portion 70, as seen in FIG. 8, and push the hinged portion 73 onto the wand 16 proximate to the nozzle 18 until the hinged portion "snaps" into place, as shown in FIG. 9.

Although the present invention has been described in considerable detail with reference to certain preferred versions thereof, other versions are possible. For example, the shield retainer can be comprised of an adhesive or fastener, such as a Velcro® fastener. Therefore, the spirit and scope of the appended claims should not be limited to the description of the preferred version contained herein.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function or "step for" performing a specified function should not be interpreted as "means for" or "steps for" clause as specified in 35 U.S.C. § 112.

What is claimed is:

1. A sprayer comprising:
   (a) a body;
   (b) a hose operably attached to the body, the hose having a spray end;
   (c) a nozzle operably attached to the hose; and
   (d) a spray shield; the spray shield, the hose and the body being configured so that the spray shield is removably attached to the body and configured for attachment to the hose proximate to the nozzle.

2. The sprayer of claim 1 wherein the body has shield retainer to which the spray shield is removably attached.

3. The sprayer of claim 1 wherein the spray shield is contoured to the body.

4. A sprayer comprising:
   (a) a body;
   (b) a hose operably attached to the body;
   (c) A wand operably attached to the hose;
   (d) a nozzle operably attached to the wand; and
   (e) a spray shield; the spray shield and the body being configured so that the spray shield is removably attached to the body.

5. The sprayer of claim 4 wherein spray shield is configured for attachment to the wand proximate to the nozzle.

\* \* \* \* \*